INVENTOR
LESLIE REGINALD BLAKE
ATTORNEY

INVENTOR
LESLIE REGINALD BLAKE
ATTORNEY

Nov. 7, 1961 L. R. BLAKE 3,007,413
DYNAMO-ELECTRIC MACHINES
Filed Oct. 11, 1956 4 Sheets-Sheet 3

INVENTOR
LESLIE REGINALD BLAKE
ATTORNEY

Nov. 7, 1961   L. R. BLAKE   3,007,413
DYNAMO-ELECTRIC MACHINES
Filed Oct. 11, 1956   4 Sheets-Sheet 4

INVENTOR
LESLIE REGINALD BLAKE
ATTORNEY.

United States Patent Office 3,007,413
Patented Nov. 7, 1961

3,007,413
DYNAMO-ELECTRIC MACHINES
Leslie Reginald Blake, Rugby, England, assignor to The British Thomson-Houston Company Limited, London, England, a British company
Filed Oct. 11, 1956, Ser. No. 615,313
Claims priority, application Great Britain Sept. 26, 1956
4 Claims. (Cl. 103—1)

This invention relates to dynamo-electric machines as represented by so-called electromagnetic pumps in which an electrically conductive liquid to be pumped, for instance a liquid metal, is propelled along a duct under the action of a transverse electromagnetic field, the operation being somewhat analogous to that of a conventional electric motor. In particular the invention is concerned with direct current electromagnetic pumps of the kind comprising a magnetic structure having pole faces defined on opposite sides of a duct, usually in the form of a tube, through which liquid to be pumped will pass, at least one exciting winding for said structure arranged on energization with direct current to set up a magnetic field across the duct, namely between the pole faces, and means for passing direct current through liquid in the duct in a direction transverse both to the duct and to the magnetic field, the liquid being propelled along the duct by interaction between the field and the current through the liquid.

It is recognized that to increase the efficiency of such pump it is desirable, especially when the liquid to be pumped is of relatively low viscosity and electrical resistivity, to grade the magnetic field so that over the length of tube for which it is effective its strength increases from a low value at each end to a maximum value obtaining at an intermediate position or over an intermediate region. Heretofore, this grading has been achieved by suitably shaping the pole faces.

It is an object of the invention to provide a pump of the kind in question in which grading of the magnetic field can be obtained more economically and effectively than heretofore with a construction that is simple and compact and can readily be designed to operate at maximum efficiency for a particular liquid to be pumped.

According to the invention in a pump of the above kind, a plurality of conductors extending transversely of the duct for liquid to be pumped are laid in slots in one or preferably each of the pole faces and are interconnected individually or in groups of two or more to define a magnetizing winding having one or more turns, the winding thus provided being connected for energization by at least part of the current which will be passed through liquid in the duct and the conductors being so distributed in the slots as to produce the required grading of the magnetic field.

In carrying out the invention, the pole faces defined by the magnetic structure may, in a practical construction such as that which will be later described herein, be provided with projecting teeth defining between them the slots for the conductors, which teeth need not be integral with the magnetic structure and may indeed have a small gap between them and the pole faces. With such construction, which may be used for simplicity of fabrication, the effect is substantially the same as if the pole faces were actually slotted and the conductors laid in the slots. Consequently reference to effective slots in a pole face is to be construed as including a construction such as that just indicated.

It is also recognized in connection with direct current electromagnetic pumps that there is an effect, analogous to armature reaction in a direct current motor, for which it is desirable to compensate. It is therefore contemplated that in a pump conforming to the invention further conductors connected in circuit with those forming the magnetizing winding or windings may likewise be laid in slots in one or each of the pole faces, the position and number of these further conductors being appropriately chosen for compensating so-called armature reaction effect in the pump.

In further describing the invention reference will be made to the accompanying drawings in which.

Figure 1:
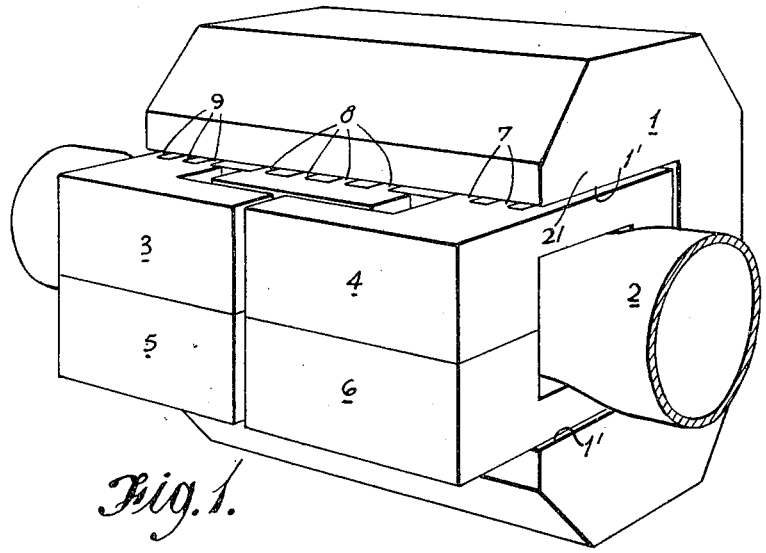
FIG. 1 is a perspective view of a practical construction of direct current electromagnetic pump embodying the invention.
Figure 2:
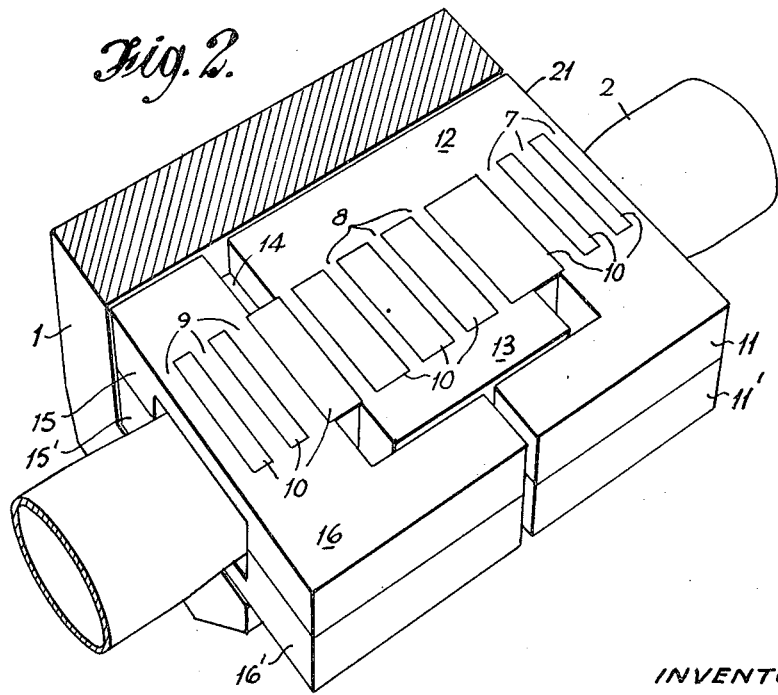
FIG. 2 is a different perspective view of the same pump with the C-shaped magnetic structure shown in horizontal section at the level of the top surface of the conductors passing above the tube.
Figure 3:
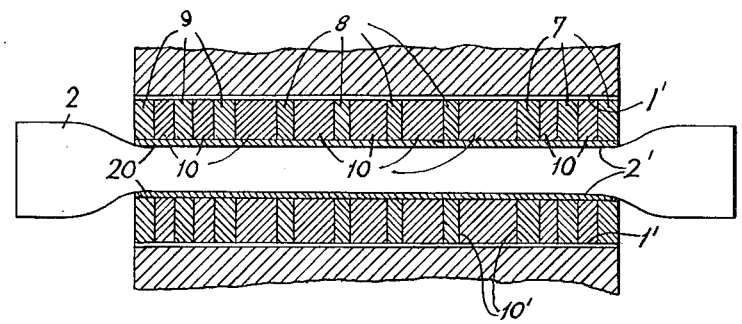
FIG. 3 is a section taken on the vertical plane containing the axis of the tube, the tube itself not being sectioned.

Referring to FIGS. 1, 2 and 3 the direct current electromagnetic pump there shown comprises a C-shaped magnetic structure 1 defining opposing pole faces 1' above and below a tube or duct 2, that is, on opposite sides 2' of the tube 2 for conveying conductive liquid to be pumped, the cross-sectional form of this tube graduating from rectangular over substantially the whole length of the structure 1 to circular beyond the ends of the structure. Conductors passing transversely across the tube above and below it, together with interconnections for these conductors are provided in the form of a number of appropriately fashioned conductive members such as 3, 4, 5, 6, the conductor portions 7, 8, 9 of these members being disposed between magnetic members 10 which constitute effective teeth for the pole faces defined by the structure 1. The conductor portions 7, 8, 9, thus lie in effective slots 10' defined between the members 10 and this construction has substantially the same effect in producing a magnetic field across the tube 2 as if the conductors were laid in slots actually formed in the pole faces.

For the purposes of FIGS. 1–3, it may be assumed that the arrangement of conductor portions and interconnecting portions is the same above and below the tube, the arrangement above the tube being seen in FIG. 2. Thus, referring to FIG. 2, the conductor portions 7 nearer or adjacent to one end 2' of the magnetic structure are interconnected in parallel with each other by a terminal connector portion 11 at their one end and a connector portion 12 at their other end. The intermediate conductor portions 8 are interconnected in parallel with each other by the connector portion 12 at their one end and a connector portion 13 at their other end. The connector portion 13, which interconnects also the intermediate conductor portions, corresponding to 8, passing beneath the tube, is secured in electrical connection with one side of the tube 2. At the opposite side of the tube 2 a conductive portion just seen at 14 is also secured in electrical connection with the tube, this latter portion lying between the connector portion 12 and the corresponding portion beneath the tube. The portion 14 is integral with or secured in electrical connection with a connector portion 15 and also a connector portion 15' corresponding thereto below the tube. The conductor portions 9 are interconnected in parallel by the connector portion 15 at their one end and a terminal connector portion 16 at their other end.

Figure 4:
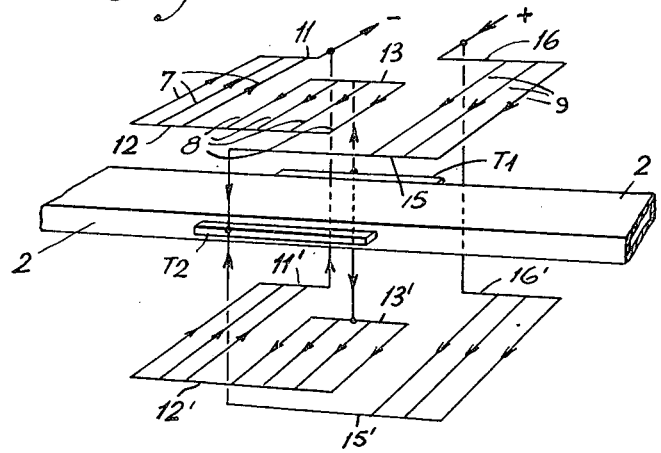
FIG. 4 is a schematic diagram of the pump, minus its magnetic structure showing the circuit provided by the particular interconnection of conductors in the pump of FIGS. 1 and 2.

In use a low voltage source of heavy direct current is connected to the terminal connector portions 11 and 16, which are respectively in electrical connection with the corresponding portions 11' and 16' for the underside of the tube. The circuit established is clearly seen in FIG. 4 which, as in the case of FIGS. 5–7 also, may be considered as a schematic diagram of the pump with its magnetic structure omitted. In FIG. 4 the tube or duct of the pump is represented at 2 and terminals T1 and T2 at opposite sides of the tube represent the current connections to the tube at these sides. The circuit extends from (+) to (−) through two parallel-connected series circuits of which one includes the conductors disposed in the effective slots of the pole face (not shown in FIGS. 4–7) above the tube and the other includes the conductors likewise disposed in the slots of the pole face below the tube. Thus as can be seen in FIG. 4 the conductors above the tube are connected in a series circuit comprising in order between (+) and (−) the terminal connector 16, the conductors 9, the connector 15, the connection represented by terminal T2, conductive liquid in the tube between terminals T2 and T1, the connection represented by terminal T1, the connector 13, conductors 8, connector 12, conductors 7 and terminal connector 11. The other series circuit is similar, including the connectors 16', 15', 13', 12', and 11'. Since the current in the conductors 7 flows in a transverse direction (relatively to the tube) which is opposite to that of the current in the conductors 9, these two groups of conductors together with their interconnections have the effect of a single-turn magnetizing winding 16–9–15–12–7–11 for the magnetic structure, the magnetic field induced being graded towards the ends of the pole pieces by virtue of the disposition of the conductor groups 7 and 9 in the neighbourhood of said ends. The corresponding groups of conductors at the underside of the tube likewise give the effect of a single-turn magnetizing winding aiding the first. Consequently since each series circuit carries half the total current, the overall magnetizing effect is equivalent to that of one single-turn winding carrying the full current. The intermediate group of conductors 8 modify the magnetic field to provide compensation for the so-called armature-reaction effect in accordance with known principles.

Figure 5:
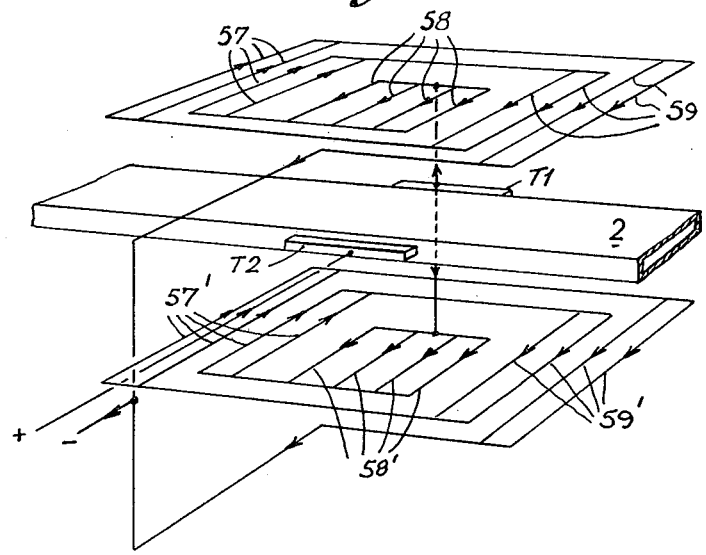
FIGS. 5–7 are schematic diagrams of possible modifications of the pump, without its magnetic structure, showing how different circuits can be obtained with appropriately changing the number, position and interconnection of the conductors.

It will be appreciated that, in respect of each series circuit defined as above described, instead of connecting the direct current source between the connectors 11 and 11' on the one hand and 16 and 16' on the other hand, these connectors could be electrically connected together and the source connected into the series loops thus formed at any other point. Thus for instance with the connector portions, 11, 11', 16, 16', connected together the conductive portion 14 (FIG. 2) could be isolated from the connector portions 15, 15' and the direct current source connected between the portion 14 on the one hand (so that one terminal of the source is connected directly to the tube side) and the portions 15 and 15' on the other hand. To facilitate this, the magnetic structure 1 would then preferably be re-arranged to extend around the opposite side of the tube thereby to leave the portions 14, 15 and 15' readily accessible. FIG. 5 illustrates the circuit that would be obtained with the connections modified as just indicated, this figure also indicating a possible variation in the number and interconnection of the conductors.

Figure 6:
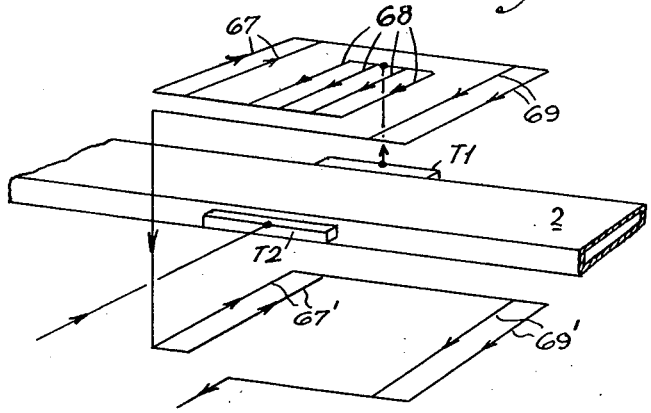
Figure 7:
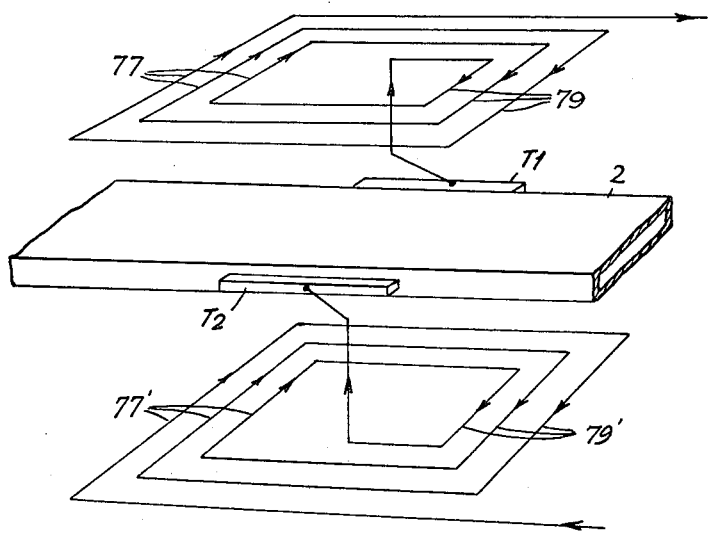

Referring to FIG. 5, in which, as also in FIGS. 4, 6 and 7, the magnetic structure defining the pole faces on opposite sides of the tube 2 has not been indicated, two groups 57 or 57' and 59 or 59', each comprising four conductors laid in respective transverse slots (not shown), are provided for each pole face of the magnetic structure, the two groups being arranged adjacent or nearer to the opposite ends of the appertaining pole face. In each group the conductors are paired by connecting the outermost conductor in parallel with the adjacent conductor and the innermost conductor with the remaining one. The pairs of parallelled conductors in each pole face are interconected in series, as shown, to define a magnetizing winding having two turns, the outer pairs being included in one turn and the inner pairs in the other.

To provide compensation for the armature-reaction effect previously mentioned, such compensation being very desirable when the liquid to be pumped is one of low viscosity, low resistivity such as liquid sodium, each pole face has a group 58 or 58' of four additional conductors (or more or less depending on the extent of compensation required) laid in further slots in the pole face between the conductor groups 57 or 57' and 59 or 59', these compensating conductors being connected in parallel with each other. The magnetizing winding defined in each pole face is connected in series with the appertaining groups 58 or 58' of parallel connected compensating conductors, and the two series circuits thus formed are connected in parallel with each other between the current terminal T1 on one side of tube 2 and one terminal of the direct current source, the terminal T2 on the other side of the tube being connected to the other terminal of the source. Thus in operation each of the magnetizing windings defined as indicated will carry half of the total current, so that since each winding has two turns there will be effectively a total of two turns carrying the total current, it being appreciated that the two windings are so interconnected that their effects are additive. Apart from some current flow in the walls of the tube, substantially all of the current will flow transversely through the liquid in the tube between the terminals T1 and T2.

Figure 8:
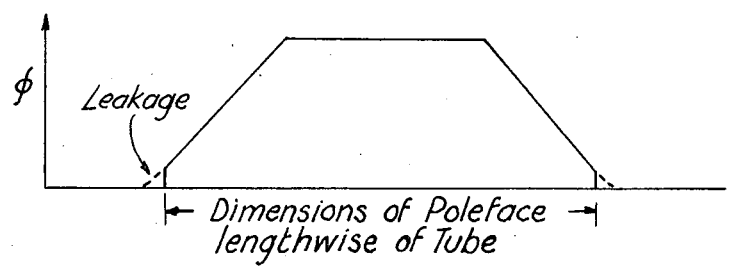
FIG. 8 is a diagram illustrating the magnetic flux grading obtained with a pump conforming to FIG. 7.

FIG. 6 illustrates a further modification of the arrangement and interconnection of the conductors. Referring to this, each pole face (not shown) has two pairs 67 or 67' and 69 or 69' of conductors laid in respective slots as before with the two pairs disposed adjacent the opposite ends of the pole face. The conductors of each pair are connected in parallel with each other and the two pairs for each pole face are interconnected in series to define a single-turn magnetizing winding. For compensating armature-reaction effect a suitable number (for example four) of additional, parallel-connected conductors 68, FIG. 6, are this time provided in one pole face only, being disposed, again in respective slots, between the two pairs of conductors 67 and 69 defining the magnetizing winding in that face. The magnetizing windings in the respective pole faces are this time connected in series with each other, and with the parallel-connected compensating conductors 68, between the current terminal T1 on one side of the tube and one terminal of the direct current source, the terminal T2 on the other side of the tube being connected to the other terminal of the source. Thus in this modification there are again two turns each carrying the total current, giving the same total excitation as the modification of FIG. 5 but with different field grading.

Where the liquid to be pumped has a relatively high viscosity and resistivity, for instance in the case of liquid bismuth, compensation for armature-reaction effect may be unnecessary but grading of the magnetic field is still desirable. In FIG. 7 a further modification is illustrated in which compensation for armature-reaction effect is omitted. Six conductors laid in slots in each pole face (again not shown) are arranged in two groups 77 or 77' and 79 or 79' disposed adjacent opposite ends of the pole face as before. In each pole face the conductors are interconnected in series, one from each group in turn, to form a magnetizing winding of three turns, and the two windings thus formed are connected in series with each other and with the current terminals T1 and T2 on the tube. These windings will accordingly each carry the total current, being as before so interconnected that their effects are additive. Assuming that the conductors are equally spaced in each group, the strength of the magnetic field produced will vary in a substantially linear manner from a low value at each end of the pole face (allowing for leakage effects) to a maximum value which will be substantially constant over the distance separating the two groups. This is illustrated by FIG. 8 in which the full line represents the variation of the magnetic field strength along the pole faces and the dotted lines indicate fringe effects due to leakage flux. A similar variation will be provided by arrangements conforming to FIGS. 4–6, except that the field strength over the intermediate section of the pole faces will be modified by the effect of the armature-reaction compensating conductors.

In all of the above examples the number of conductors employed and the number of magnetizing turns into which they are connected may be varied as circumstances require, suitable modifications being made in the practical construction shown in FIGS. 1 and 2. Such modifications are thought to be well within the scope of one skilled in the art, so as not to require further description here. The voltage is usually very low, the current being high, and it is therefore contemplated that the conductors would not need to be individually insulated, mica or other insulation being provided instead under the teeth defined between the slots in the pole faces, with suitable spacing (of a small order) left between conductors of different potential where they lie close to each other. Thermal insulation would normally be provided between the tube 2 and the conductors lying in the effective pole face slots, as indicated at 20 in FIG. 3.

What I claim is:

1. A direct current electromagnetic pump comprising a duct for conveying conductive liquid to be pumped, a magnetic structure defining pole faces disposed on opposite sides of said duct between which pole faces a magnetic field is adapted to be set up across said duct, means applied to said duct for applying direct current through liquid therein in a direction transverse both to said field and to the length of said duct, a plurality of conductors disposed in effective slots in at least one of said pole faces and extending transversely of said duct, said conductors including a first group thereof nearer one end of said pole face, a second group thereof nearer the other end of said pole face and an intermediate group, connector means interconnecting the conductors of said first and second groups to provide for current flow therethrough in one direction in the conductors of the first group and in the opposite direction in the conductors of the second group thereby providing an effective magnetizing winding, said winding being connected for energization by at least part of the current applied through the liquid, and further connector means interconnecting the conductors of said intermediate group with said magnetizing winding to carry current in opposite direction to the direction of the current through the conductive liquid, thereby to provide compensation for so-called armature reaction effect in the pump.

2. An electromagnetic pump as claimed in claim 1 in which the conductors of each group and connectors connecting the group conductors in parallel, are defined in a single, appropriately fashioned, member of conductive material.

3. A direct current electromagnetic pump comprising a duct for conveying conductive liquid to be pumped, a magnetic structure defining pole faces disposed on opposite sides of said duct between which pole faces a magnetic field is adapted to be set up across said duct, means applied to said duct for applying direct current through liquid therein in a direction transverse both to said field and to the length of said duct, a plurality of conductors disposed in effective slots in at least one of said pole faces and extending transversely of said duct, said plurality of conductors being constituted by at least one group of conductors disposed nearer one end of said pole face, at least one group of conductors disposed nearer the other end of said pole face, and an intermediate group of conductors, connector means connecting the conductors of each group in parallel with each other, means connecting the said groups nearer the ends of the pole face in series circuit with each other to constitute a magnetizing winding for producing said magnetic field, and further means connecting the intermediate group in series with said magnetizing winding for effecting compensation for so-called armature reaction effect in the pump.

4. A direct current electromagnetic pump comprising a duct for conveying conductive liquid to be pumped, a magnetic structure defining pole faces disposed on opposite sides of said duct between which pole faces a magnetic field is adapted to be set up across said duct, means applied to said duct for applying direct current through liquid therein in a direction transverse both to said field and to the length of said duct, at least one group of conductors disposed in effective slots relatively nearer one end of a pole face, at least one other group of conductors disposed in effective slots nearer the other end of said pole face and an intermediate group of conductors also disposed in effective slots in said pole face, the conductors in each group extending transversely of said duct and being connected in parallel with each other, the groups adjacent the ends of said pole face being connected in series circuit with each other to constitute a magnetizing winding for producing said magnetic field, and the intermediate group being connected in series with said magnetizing winding as constituted by the other groups for providing compensation for so-called armature reaction effect in the pump.

References Cited in the file of this patent

UNITED STATES PATENTS

| 2,386,369 | Thompson | Oct. 9, 1945 |
| 2,686,474 | Pulley | Aug. 17, 1954 |
| 2,715,686 | Asti | Aug. 16, 1955 |
| 2,798,434 | Brill et al. | July 9, 1957 |

FOREIGN PATENTS

| 699,925 | Great Britain | Nov. 18, 1953 |